(No Model.) 2 Sheets—Sheet 1.
E. HÜBNER.
FILTER PRESS AND FILTER PRESS PLATE.
No. 571,368. Patented Nov. 17, 1896.
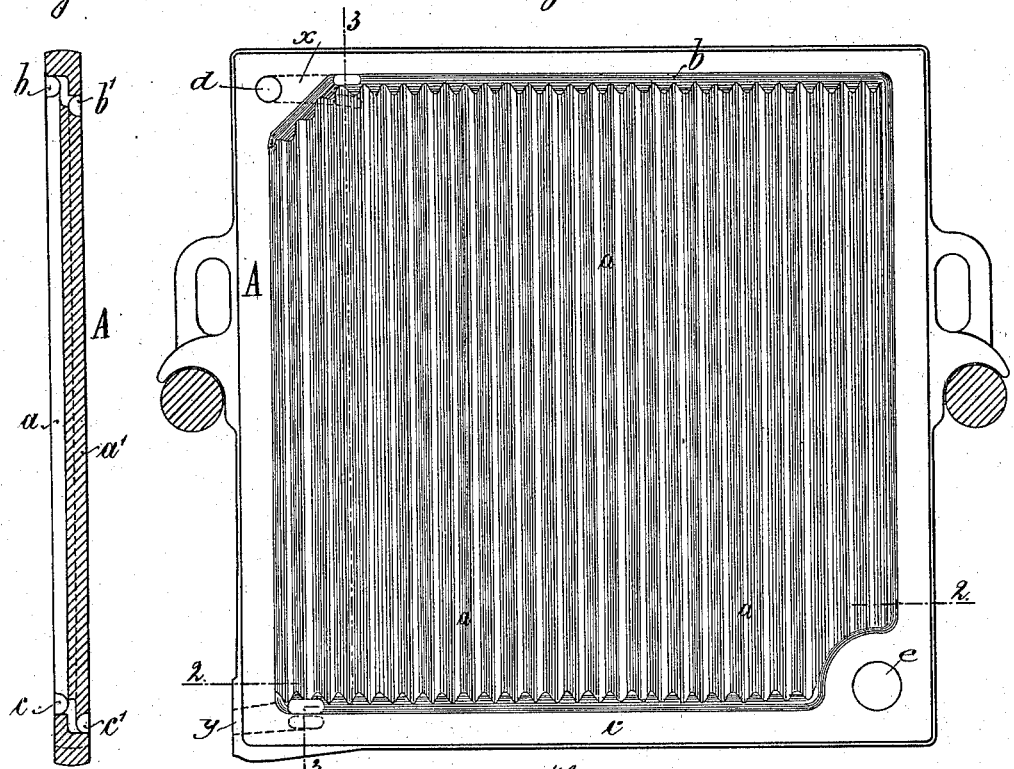
WITNESSES:
Fred White
Thomas F. Wallace
INVENTOR:
Ernst Hübner,
By his Attorneys (No Model.) 2 Sheets—Sheet 2.

E. HÜBNER.
FILTER PRESS AND FILTER PRESS PLATE.

No. 571,368. Patented Nov. 17, 1896.

WITNESSES:
Fred White
G. K. Fraser.

INVENTOR:
Ernst Hübner,
By his Attorneys:
Arthur C. Fraser & Co

UNITED STATES PATENT OFFICE.

ERNST HÜBNER, OF HALLE, GERMANY.

FILTER-PRESS AND FILTER-PRESS PLATE.

SPECIFICATION forming part of Letters Patent No. 571,368, dated November 17, 1896.

Application filed August 11, 1894. Serial No. 520,012. (No model.)

*To all whom it may concern:*

Be it known that I, ERNST HÜBNER, engineer, a subject of the German Emperor, residing in Halle, Germany, have invented certain new and useful Improvements in Filter-Presses and Filter-Press Plates, of which the following is a specification.

This invention relates to that class of filters in which a great number of chambers are formed between suspended filter-plates having channels on their faces, covered by filter-cloths, and held together by being pressed between heads. In such filters the mash or other material to be filtered is forced under great pressure into the chambers between the plates, and the liquid contents escape through the filter-cloths into the grooves or channels in the plates, and are then drawn off by suitable cocks communicating with a bottom duct or gutter formed on each plate. In such plates as heretofore constructed there has been great liability of breakage in use, because of the great pressure to which the plate is subjected and the inequalities in the strength of its grooved or channeled body.

The present invention aims to provide a filter-plate of uniform internal strength, and one which will resist all the ordinary strains of use without breakage.

To this end in carrying out the invention I dispose not only the grooves on the respective faces of the plate in alternation, but also the inlet and outlet gutters on the faces, whereby a gutter as well as a groove on one side is opposite a ridge on the other side, thereby rendering the thickness of the metal intervening between the two faces substantially uniform throughout the grooved portion of the plate.

Figure 5:
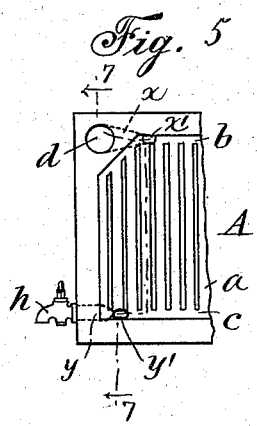
Figure 6:
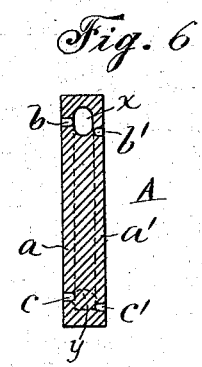
Figure 7:
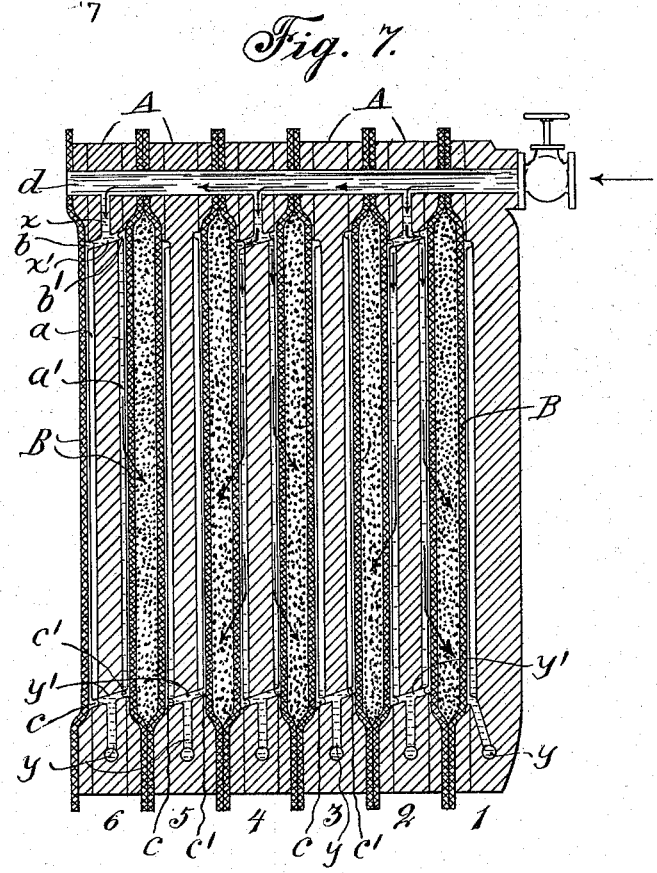

In the accompanying drawings, which illustrate the preferred embodiment of the invention, Figure 1 is a face view of a filter-plate. Fig. 2 is a horizontal section thereof cut on the line 2 2. Fig. 3 is a vertical section thereof cut on the line 3 3 in Figs. 1 and 2, and Fig. 4 is a side elevation of a filter-press of the kind in which my improved plates are used. Fig. 5 is a fragmentary side elevation of one of the filter-plates on a small scale, showing its cock $h$ closed. Fig. 6 is a cross-section thereof. Fig. 7 is a schematic or diagrammatic fragmentary enlarged sectional view cut on the line 7 7 of Fig. 5 and illustrating the usual mode of using such filters.

Referring to the drawings, let A indicate the filter-press plates; B, the filter-cloth thereon; K, the head-piece of a filter-press; E, the movable end piece thereof; F, the clamping-screw for this piece, and G the supporting-rods for the plates A.

$e$ is the usual inlet communicating with the interior of the filter, and $h$ are the usual cocks for the discharge of the escaping liquor.

The filter-plates A are grooved on both sides, and these grooved faces are covered by the filter-cloth B, as usual. A number of plates thus covered are pressed together between the head-piece by means of the screw F. Each plate is supported by lugs resting on the rod G, on which the plates slide when the movable piece E is screwed up against them to clamp them between itself and the head-piece K.

In such presses a chamber is formed between every two plates, and these chambers communicate with the common inlet $e$, through which the mash or other material to be filtered is forced under great pressure by means of a pump or otherwise. In the chambers the solid particles in the mass are retained by the filter-cloths, and the fluid portion flows through the cloths into the grooves or channels in the face of the filter-plates, down which grooves the fluid flows to the lower portion of the plate, where all the grooves of one side unite in a common gutter or cross-channel, which communicates with the outlet-cock of the plate. With the style of plates having gutters located exactly opposite each other the severe pressure applied by means of the screw F to clamp the plates together and also the unevenness of the pressure within the chambers between the plates have often caused the breaking or fracture of the plates, which is a great hindrance to the working of such presses and a disadvantage likely to frequently occur, because plates so constructed cannot stand much pressure. This inconvenience is avoided by my present invention by constructing the inlet and outlet gutters, as well as the grooves on one side of the plate, in alternation of the corresponding portions on the other side thereof, whereby any great differences in the thickness of the intervening metal are avoided. This is preferably accomplished in the construction shown by disposing the inlet-gutter $b$ and the outlet-gutter $c$ sufficiently above the gutters $b'$ and $c'$, respectively, of the opposite side to leave an extensive thickness between them. One face of the plate is constructed with vertical grooves $a$ and the opposite face with like grooves $a'$, the bottoms of which are opposite the tops of the ridges between the grooves $a$, while the bottoms of the latter are opposite the tops of the ridges of the grooves $a'$. Thus both the gutters and grooves on one side are alternated relatively to those on the other side, and hence the thickness of the intervening metal between the grooved sides is substantially uniform throughout the cross-section of this part of the plate, and at no point is it so thin as to be liable to break. No increased expense is incurred in making the improved plate, and it is as easy of manipulation as those formerly employed, and the strength of the plate is increased, so as to avoid danger of breakage. This results from the fact that the uniform thickness between the opposite sides, due to situating both the grooves and gutters alternately, would ordinarily be greater than the requisite strength demanded for the plate.

In filter-plates of the construction shown the plate A has a transverse feed-channel $d$ for the washing liquid, an internal channel $x$, connecting this with the two inlet-gutters $b$ $b'$, and an internal channel $y$, leading from the two outlet-gutters $c$ $c'$ to the discharge-cock $h$. In operation each plate having a channel $x$ has its channel $y$ closed by closing its cock $h$, while the next plate, which has no channel $x$, has its channel $y$ open by opening its cock $h$. This is the usual and well-known construction of such filters. The washing fluid flows through the channel $d$ and the channel $x$ into the gutters and grooves on both faces of the plate, and its escape through the outlet-channel $y$ is ordinarily arrested by the corresponding cock $h$. The washing fluid must therefore flow outwardly from the plate through the filter-cloth B, through the mass of material to be filtered or washed, which lies between this cloth and that of the adjacent plate, and then through the cloth covering the latter into the grooves thereof, through which grooves it flows down to the outlet-gutters thereof, from which gutters it is discharged through the internal channel $y$ of such plate, for which purpose the cock $h$ of such plate is left open. The washing fluid must therefore extend over the whole mass of material between the plates, penetrate through this mass, and wash it out in order to reach the neighboring plate and flow out therefrom. Each alternate plate is provided with the internal channel $x$, and the cocks of these plates are closed, while the cocks of the intermediate plates are open. The intermediate plates do not require any channel $x$.

The filter-cloths B keep the mass to be washed out from reaching the grooves, gutters, and channels of either plate, as usual.

The main feature of this invention lies in the arrangement of the inlet and outlet gutters $b$ $b'$ and $c$ $c'$ in alternating positions on the opposite faces of the plate, so that the latter is strong enough to resist the heavy inner pressure between the plates. Danger of breakage has been especially great in plates where these gutters have been directly opposite, where the internal channels $x$ and $y$ join the gutters.

For the purpose of not interrupting the course of the washing fluid the channels $x$ are represented in the schematic view, Fig. 7, as being vertical. The channels $x$ are, however, in practice horizontal, as can be seen on the other figures, and a cross-channel $x'$ leads from the end of each channel $x$ into the upper inlet-gutters $b$, as usual. Bearing this in mind, the usual operation of the filter-press is as follows: The washing fluid is entered through a valve on the one head-plate of the press into the channel $d$, and it enters the channel $x$, passes through the transverse channel $x'$ and over both sides of each alternate filter-plate 2, 4, and 6 by means of the upper inlet-gutter $b$, which distributes the washing fluid through the vertical grooves $a$ $a'$. From these grooves the fluid passes into the channel $y$, the cock of which (not represented in the schematic view, Fig. 7) is closed, as shown in Fig. 5. As the washing fluid is stopped at this point it must have another outlet. When the pressure of the entering fluid rises, the washing fluid penetrates in the direction of the arrows, Fig. 7, the entire acting surface of the filter-plate, the filter-cloths, and then the mass, so as to pass into the vertical grooves $a$ $a'$ of the intermediate plates 1 3 5, &c. From these the washing fluid passes into the under outlet-gutters $c$ $c'$, which lead the fluid into the corresponding channels $y'$ and through the opened cocks (not represented in the schematic view, Fig. 7) of the channels $y'$ of the plates 1 3 5, escaping from the filter-press.

It will be seen from this that the washing fluid does not pass directly through the channel $x$, the grooves $a$ $a'$, and through the cock, but in consequence of the fact that the filter-plates 2 4 6 are provided with the inlet-channel $d$ and channel $x$, and that the outlet-cocks $h$ thereof are closed, while the filter-plates 1 3 5 are provided with a channel $d$, but not with a channel $x$, and while their outlet-cocks are opened, the filter action as described takes place, and the washing fluid must penetrate with a pressure of several atmospheres through the filter-cloths in the mass and once more through a filter-cloth, so as to be able to pass into the vertical grooves of the neighboring filter-plates and then into the outlet-cock.

It will be understood that the invention is not limited in its use to the particular style of plates or the particular construction of filter set forth, but that it may be availed of according to such modifications as circumstances or the judgment of those skilled in the art may dictate, without departing from the essential feature of the invention.

What I claim is—

In a filter-plate having on each face a series of upright parallel grooves, those on one face alternated in position relatively to those on the others, and having an internal channel, the transverse gutters $b$ and $b'$ at top and the transverse gutters $c$ $c'$ at bottom connecting the ends of the grooves on the opposite faces of the plate, the gutters on one face of the plate being above those on its other face, two of said gutters communicating with said channel, whereby by placing said gutters one above the other a suitable thickness of metal exists between them, substantially as and for the purpose set forth.

ERNST HÜBNER.

Witnesses:
ADOLF SCHULZE,
ADOLPH BEŸER.